United States Patent [19]

Ichikawa et al.

[11] Patent Number: 5,510,456
[45] Date of Patent: Apr. 23, 1996

[54] BRIDGED CYCLIC ARLENEETHYLENE POLYMERS

[75] Inventors: Reiko Ichikawa; Yoshiaki Ikenoue, both of Tokyo, Japan; Fred Wudl, Santa Barbara, Calif.

[73] Assignee: Showa Denko K. K., Tokyo, Japan

[21] Appl. No.: 261,299

[22] Filed: Jun. 16, 1994

Related U.S. Application Data

[63] Continuation of Ser. No. 935,294, Aug. 26, 1992, abandoned, which is a continuation-in-part of Ser. No. 791,277, Nov. 13, 1991, abandoned.

[51] Int. Cl.⁶ .......................... C08G 75/00; C08G 73/06
[52] U.S. Cl. .................. 528/377; 252/500; 526/256; 526/259; 526/268; 528/403; 528/423
[58] Field of Search ........................ 528/373, 377, 528/380, 403, 423

[56] References Cited

U.S. PATENT DOCUMENTS

| | | | |
|---|---|---|---|
| 4,802,745 | 2/1989 | Okada | 350/397 |
| 5,162,473 | 11/1992 | Jen | 526/286 |

OTHER PUBLICATIONS

Brédas, J. L., et al, Nonlinear Optical Properties of Organic Materials, 971, pp. 42–50 (1988).

*Primary Examiner*—Christopher Henderson
*Attorney, Agent, or Firm*—Sughrue, Mion, Zinn, Macpeak & Seas

[57] ABSTRACT

A polymer represented by the following formula (III)

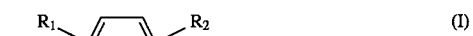

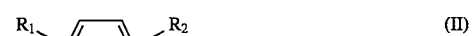

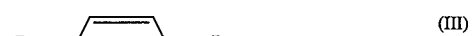

wherein $R_1$ and $R_2$ each independently represents H, a straight or branched alkyl group or alkoxy group having 1 to 20 carbon atoms, X is S, O, or $NR_3$, $R_3$ represents a straight or branched akyl group having 1 to 6 carbon atoms or a phenyl group, Y represents $R_4S^+R_5M^-$ or $OR_6$, $R_4$ and $R^5$ each independently represent a straight or branched alkyl group having 1 to 5 carbon atoms, or form a heterocyclic ring together with sulfur, and $M^-$ is an anion, $R_6$ represents H or a straight or branched alkyl group having 1 to 10, m is 1 to 2, and n represents a degree of polymerization and is a value larger than 5.

9 Claims, 5 Drawing Sheets

BRIDGED CYCLIC ARLENEETHYLENE POLYMERS

CROSS-REFERENCE TO RELATED APPLICATION

This application is a File Wrapper Continuation of Application No. 07/935,294, filed Aug. 26, 1992 now abandoned which is a Continuation-In-Part Application of Application 07/791,277, filed Nov. 13, 1991, now abandoned.

BACKGROUND OF THE INVENTION

1. Field of the Invention

The present invention relates to novel arylenevinylene polymers, precursor polymers suitable for use as electrodes, sensors, electronics display elements, photoelectric converting elements, non-linear optical elements, photosensitive members for electrophotography and other various electroconductive materials or optical materials in the electrical and electronic fields, and processes for the production thereof.

2. Description of the Related Art

Polymers having high γ-conjugated chains have attracted much attention industrially because of their characteristics such as electroconductivity or state of transmission between a metal and semiconductor transition, and much research has been carried out. Particularly, since 1984, in addition to polythiophene, poly-p-phenylene and polyfuran, polyarylenevinylenes have attracted attention because of their higher molecular weights and excellent processability.

For example, U.S. Pat. No. 3,706,677 discloses polyphenylenevinylene, and Japanese Unexamined Patent Publications (Kokai) Nos. 61-148231, 64-79222, and 64-79223 disclose polythienylenevinylene and polyfuranylenevinylene, and processes for the production thereof. The processes for producing arylenevinylene polymers as described in these publications include eliminating the side chains from the precursor polymers having sulfonium salts, or alkoxy groups as the side chains at the ethylene group adjacent to the respective heterocyclic rings such as thiophene and furan. Usually, arylenevinylene polymers are insoluble in solvents, but these precursors are soluble in solvents, and therefore, can be easily processed and molded to form films and fibers, and can be oriented by stretching.

Furthermore, JP-A-61-148231 discloses polyarylenevinylenes having substituents and WO 88/00954 discloses polymers and copolymers of arylenevinylene having substituents. However, although the former relates to polythiophenes or the derivatives thereof having various substituents and the latter is of general extremely wide application including variety of compounds, which, at glance, seem to show the chemical structure similar to the compounds according to the present invention, there are no specifical disclosures suggesting the present compounds in the references.

The difference between benzo[b]thiophene and benzo[c]thiophene will now be explained. The benzo[b]thiophene is chemically stable, when compared with the thiophene, and an extremely less reactive compound. Contrary to this, the benzo[c]thiophene has an extremely high reactivity and can be stably present only one day even at −30° C. under nitrogen. Thus, these two compounds have quite different chemical properties with respect to the reactivity thereof, although they are structural isomers with respect to the hetero atom. Please refer, in more detail, to "An Introduction to the Chemistry of Heterocyclic Compounds (Third Edition), R. M. Acheson, (John Wiley & Sons, Inc., 1976)".

In addition, the difference between polybenzo[b]thiophene and polybenzo[c]thiophene will be explained. The production processes and the physical properties are described, for example, in Makromol. Chem., Rapid Commun., 8, 325(1987) for the former and in J. Org. Chem., 49., 3382(1984) for the latter. For the electric properties thereof, it is reported that the energy gap(Eg) of the former is 2.9–3 eV and that of the latter is quite different and is 1.1 eV. Thus, it is known in the art that both the monomers and the polymers of benzo[b]thiophene and benzo[c]thiophene are quite different in the properties thereof.

Furthermore, U.S. Pat. No. 4,837,096 exemplifies arylene vinylenes having, as an aromatic ring, structures of benzo[b]thiophene, benzo[b]furan and benzo[b]pyrrole. However, these compounds are completely different in the chemical structures thereof from the benzo[c]thiophene, benzo[c]furan, and benzo[c]pyrrole according to the present invention. The present compounds are not specifically disclosed in this reference at all.

Nevertheless, bicyclic arylenevinylene polymers having highly π-conjugated systems, such as arylenevinylene polymers having an isothianaphthene structure, were handled only as a model compound at the ab initio level by J. L. Bredas et al (SPIE Vol. 971, Nonlinear Optical Properties of Organic Materials (1988)), and nothing is known about the process for producing the above polymer. Particularly, there has been no suggestion to date that arylenevinylene polymers have isobenzofuran and isoindole structures. Isothianaphthene, isobenzofuran and isoindole, which are the starting monomers of these polymers, are unstable in air, and therefore, cannot be synthesized by the production processes used for other arylenevinylene polymers such as polythienylenevinylene, as hitherto reported.

SUMMARY OF THE INVENTION

Accordingly, an object of the present invention is to provide novel arylenevinylene polymers having a high practical value, and processes for producing arylenevinylene polymers by obtaining the stable precursor polymers in air, followed by carrying out a heat treatment.

Other objects and advantages of the present invention will be apparent from the following description.

In accordance with the present invention, there is provided an arylenevinylene polymer of the formula (I):

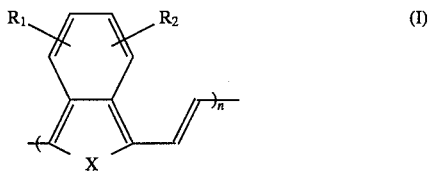

wherein $R_1$ and $R_2$ each independently represent H, a straight or branched alkyl group or alkoxy group having 1 to 20 carbon atoms, X is S, O or $NR_3$, $R_3$ represents H, a straight or branched alkyl group having 1 to 6 carbon atoms or a phenyl group, and n represents a degree of polymerization and is a value larger than 5, provided that $R_1$ and $R_2$ can additionally contain —CO—, —O—, —COO— or —NHCO—.

Doped arylenevinylene polymers of the formula (II) obtained from the chemically or electrochemically doping of polymer (I):

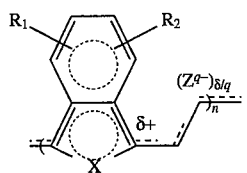

(II)

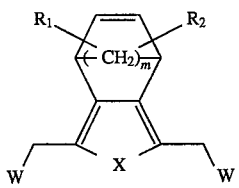

(V)

wherein $R_1$ and $R_2$ each independently represent H, a straight or branched alkyl group or alkoxy group having 1 to 20 carbon atoms, provided that $R_1$ and $R_2$ can additionally contain CO—, —O—, —COO— or —NHCO—, X is S, O or $NR_3$, $R_3$ represents H, a straight or branched alkyl group having 1 to 6 carbon atoms or a phenyl group, n represents a polymerization degree and is a value larger than 5, $\delta$ is a value of 0.7 or less, Z represents an anion, and q is 1 or 2.

In accordance with the present invention, there are also provided precursor polymers of the formula (III):

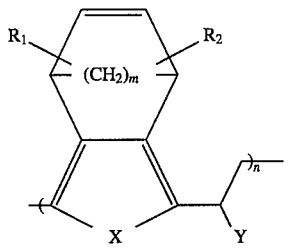

(III)

wherein $R_1$ and $R_2$ each independently represent H, a straight or branched alkyl group or alkoxy group having 1 to 20 carbon atoms, provided that $R_1$ and $R_2$ can additionally contain —CO—, —O—, —COO— or —NHCO—, X is S, O or $NR_3$, $R_3$ represents H, a straight or branched alkyl group having 1 to 6 carbon atoms or a phenyl group, Y is represented by $R_4S^+R_5M^-$ or $OR_6$, $R_4$ and $R_5$ each independently represent a straight or branched alkyl having 1 to 5 carbon atoms, or form a heterocyclic ring together with sulfur, and $M^-$ is an anion, $R_6$ represents H or a straight or branched alkyl group having 1 to 10 carbon atoms, the alkyl group or alkoxy group in the above $R_6$ can additionally contain a —CO—, —O—, ester or —NHCO— group, m is 1 or 2, and n represents a degree of polymerization and is a value larger than 5.

In accordance with the present invention, there is further provided a process for producing the above arylenevinylene polymer, which comprises applying a heating treatment or heating and acid treatments to at least one polymer selected from these polymers. Further, the present invention concerns a process for producing precursor polymers of the above formula (III), which comprises reacting a halogenating agent with a compound represented by the formula (IV):

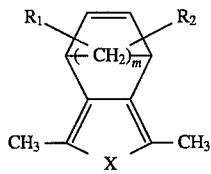

(IV)

wherein $R_1$, $R_2$, X and m are as defined above to obtain a compound represented by the formula (V):

wherein $R_1$, $R_2$, X and m are as defined above, and W is a halogen atom, reacting to a chain or cyclic compound containing a sulfur atom with the compound obtained, to obtain a compound represented by formula (VI):

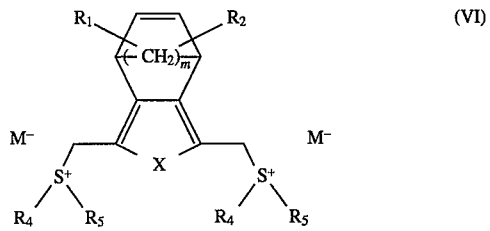

(VI)

wherein $R_1$, $R_2$, X, and m are as defined above, $R_4$ and $R_5$ represent each independently a straight or branched alkyl having 1 to 5 carbon atoms, or form a heterocyclic ring together with sulfur, and $M^-$ is an anion, and then polymerizing the compound obtained in the presence of a base. Examples of useful groups as $R_1$ and $R_2$ are hydrogen atom, alkyl (e.g., methyl, ethyl, propyl, butyl, pentyl, hexyl, heptyl, octyl, nonyl, isobutyl, isopropyl, dodecyl), and alkoxy (e.g., methoxy, ethoxy, propyloxy, butoxy, isopropyloxy, pentoxy, octyloxy). Examples of useful groups as $R_3$ are hydrogen atom, alkyl (e.g., methyl, ethyl, propyl, butyl, pentyl, hexyl, isopropyl, isobutyl, isopentyl), phenyl.

BRIEF DESCRIPTION OF THE DRAWINGS

The present invention will be better understood from the description set forth below with reference to the accompanying drawings, wherein.

DESCRIPTION OF THE PREFERRED EMBODIMENTS

Figure 1:
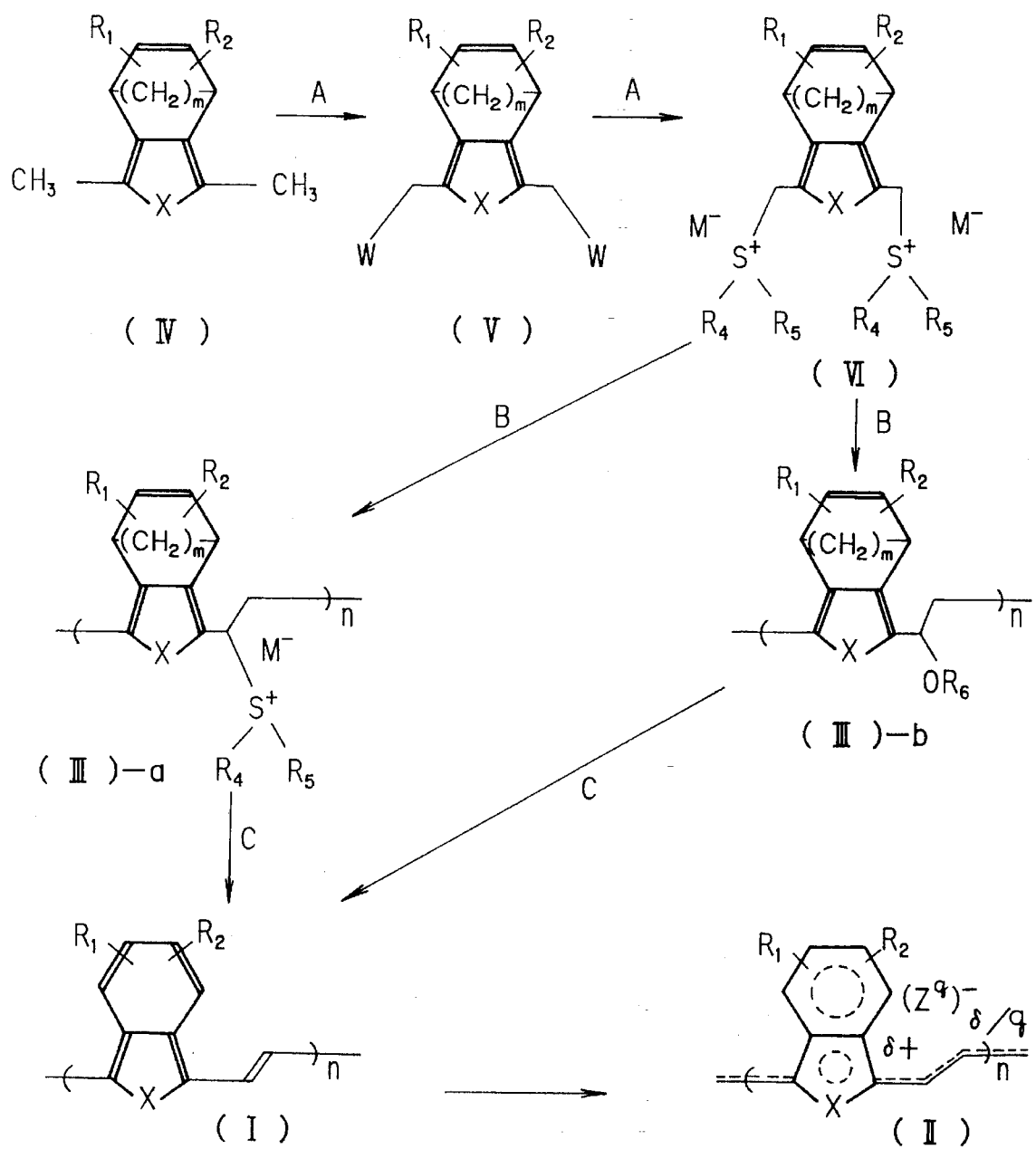
FIG. 1 is a schematic chart illustrating synthesis routes of the arylenevinylene polymers and the doped products thereof according to the present invention.

The arylenevinylene polymer represented by the formula (I) of the present invention is a polymer comprising the repeating units of the bicyclic system arylenevinylene structure having a vinylene group at the 2-position of the structure comprising a heterocyclic ring and a 6-membered ring, each repeating unit represents isothianaphthenevinylene, isobenzofuranvinylene and isoindolevinylene structures. The molecular weight is preferably from 1,000 to 500,000, more preferably from 10,000 to 500,000.

Examples of the polymer having the general formula (I) are poly(isothianaphthenylenevinylene), poly(5-methylisothianaphthenylenevinylene), poly(5-ethylisothianaphthenylenevinylene), poly(5-propylisothianaphthenylenevinylene), poly(5-butylisothianaphthenylenevinylene), poly(5-pentylisothianaphthenylenevinylene), poly(5-hexylisothianaphthenylenevinylene), poly(5-heptylisothianaphthenylenevinylene), poly(5-octylisothianaphthenylenevinylene), poly(5-nonylisothianaphthenylenevinylene), poly(5-decylisothianaphthenylenevinylene), poly(5-dodecylisothianaphthenylenevinylene), poly(5-hexadecylisothianaphthenylenevinylene), poly(5-isopropylisothianaphthenylenevinylene), poly(5-methoxyisothianaphthenylenevinylene), poly(5-ethoxyisothianaphthenylenevinylene), poly(5-propyloxyisothianaphthenylenevinylene), poly(5-butoxyisothianaphthenylenevinylene), poly(5-isopropyloxyisothianaphthenylenevinylene), poly(5-pentoxyisothianaphthenylenevinylene), poly(5-octyloxyisothianaphthenylenevinylene), poly(5,6-dimethylisothianaphthenylenevinylene), poly(5,6-diethylisothianaphthenylenevinylene), poly(5,6-dipropylisothianaphthenylenevinylene), poly(5-ethoxycarbonylisothianaphthenylenevinylene), poly(isobenzofuranylenevinylene), poly(5-methylisobenzofuranylenevinylene), poly(5-ethylisobenzofuranylenevinylene), poly(5-propylisobenzofuranylenevinylene), poly(5-butylisobenzofuranylenevinylene), poly(5-pentylisobenzofuranylenevinylene), poly(5-hexylisobenzofuranylenevinylene), poly(5-heptylisobenzofuranylenevinylene), poly(5-octylisobenzofuranylenevinylene), poly(5-nonylisobenzofuranylenevinylene), poly(5-decylisobenzofuranylenevinylene), poly(5-dodecylisobenzofuranylenevinylene), poly(5-hexadecylisobenzofuranylenevinylene), poly(5-isopropylisobenzofuranylenevinylene), poly(5-methoxyisobenzofuranylenevinylene), poly(5-ethoxyisobenzofuranylenevinylene), poly(5-propyloxyisobenzofuranylenevinylene), poly(5-butoxyisobenzofuranylenevinylene), poly(5-isopropyloxyisobenzofuranylenevinylene), poly(5-pentoxyisobenzofuranylenevinylene), poly(5-octyloxyisobenzofuranylenevinylene), poly(5,6-dimethylisobenzofuranylenevinylene), poly(5,6-diethylisobenzofuranylenevinylene), poly(5,6-dipropylisobenzofuranylenevinylene), poly(5-ethoxycarbonylisobenzofuranylenevinylene), poly(isoindolylenevinylene), poly(5-methylisoindolylenevinylene), poly(5-ethylisoindolylenevinylene), poly(5-propylisoindolylenevinylene), poly(5-butylisoindolylenevinylene), poly(5-pentylisoindolylenevinylene), poly(5-hexylisoindolylenevinylene), poly(5-heptylisoindolylenevinylene), poly(5-octylisoindonylenevinylene), poly(5-nonylisoindolylenevinylene), poly(5-decylisoindolylenevinylene), poly(5-dodecylisoindolylenevinylene), poly(5-hexadecylisoindolylenevinylene), poly(5-isopropylisoindolylenevinylene), poly(5-methoxyisoindolylenevinylene), poly(5-ethoxyisoindolylenevinylene), poly(5-propyloxyisoindolylenevinylene), poly(5-butoxyisoindolylenevinylene), poly(5-isopropyloxyisoindolylenevinylene), poly(5-penthoxyisoindolylenevinylene), poly(5-octyloxyisoindolylenevinylene), poly(5,6-dimethylisoindolylenevinylene), poly(5,6-diethylisoindolylenevinylene), poly(5,6-dipropylisoindolylenevinylene), poly(5-ethoxycarbonylisoindolylenevinylene), poly(N-methylisoindolylenevinylene), poly(N-methyl-5-methylisoindolylenevinylene), poly(N-methyl-5-ethylisoindolylenevinylene), poly(N-methyl-5-propylisoindolylenevinylene), poly(N-methyl-5-butylisoindolylenevinylene), poly(N-methyl-5-pentylisoindolylenevinylene), poly(N-methyl-5,6-dimethylisoindolylenevinylene), poly(N-methyl-5,6-diethylisoindolylenevinylene), poly(N-methyl-5-methoxyisoindolylenevinylene), poly(N-methyl-5,6-dimethoxyisoindolylenevinylene), poly(N-methyl-5-ethoxycarbonylisoindolylenevinylene), poly(N-phenylisoindolylenevinylene), poly(N-phenyl-5-methylisoindolylenevinylene), poly(N-phenyl-5-ethylisoindolylenevinylene), poly(N-phenyl-5-propylisoindolylenevinylene), poly(N-phenyl-5-butylisoindolylenevinylene), poly(N-phenyl-5-pentylisoindolylenevinylene), poly(N-phenyl-5,6-dimethylisoindolylenevinylene), poly(N-phenyl-5-methoxyisoindolylenevinylene), poly(N-phenyl-5,6-dimethoxyisoindolylenevinylene), and poly(N-phenyl-5-ethoxycarbonylisoindolylenevinylene).

The arylenevinylene polymer of the present invention is a novel substance, has an energy gap as small as about 1.5 eV or less, compared with known arylenevinylene polymers, and therefore, exhibits a high electroconductivity, and is a suitable as a compound for electroconductive polymers, particularly for semiconductor use, and further has a small absorbance of visible light during doping, and therefore, can be utilized as a transparent electroconductor.

The arylenevinylene polymer represented by the formula (I) can be chemically or electrochemically oxidized to give an amphoteric arylenevinylene polymer represented by the formula (II), and the polymer represented by the formula (II) can be reduced chemically or electrochemically to the polymer represented by the formula (I). Namely, the polymers of the formula (I) and (II) can be reversibly doped according to the redox reactions thereof.

Any known chemical or electrochemical doping methods may be applied as the doping method. For example, as the chemical doping method, a gas phase method in which the arylenevinylene polymer film is reacted with a dopant such as iodine in a gas phase, and as the electrochemical doping method, a method in which the arylenevinylene polymer is sandwiched between the electrodes and a voltage is applied to a solution containing a dopant, are included (see "Dodensei Koubunshi no Kiso to Oyo" - Gosei.Bussei.Hyoka.Oyo Gijutsu - Kabushiki Kaisha IPC).

Z in the formula (II) represents an anion and functions as the dopant, including halide anions of the group Vb elements such as $PF_6^-$, $SbF_6^-$, $AsF_6^-$, and $SbCl_6^-$, halide anions of the groups IIIb elements such as $BF_4^-$, halide anions such as $I^-(I_3^-)$, $Br^-$, and $Cl^-$, perchlorate anions such as $ClO_4^-$, Lewis-acids, protonic acids, and electrolyte anions, but the invention is not limited thereto. Also, a plurality of dopants can additionally be used in combination. Here, δ represents the doping level, indicated as from 0 to 0.7 per one repeating monomer unit, and q represents the valence of the anion represented by Z, and is 1 or 2.

The polymers represented by the formula (III) are novel precursor compounds. In the precursor polymer having the formula (III), $R_1$, $R_2$, X and n are the same as defined in the polymer represented by the formula (I). Namely, $R_1$ and $R_2$ each independently represents H, a straight or branched alkyl group or alkoxy group having 1 to 20 carbon atoms, X is S, O, or $NR_3$, wherein $R_3$ represents H, a straight or branched alkyl group having 1 to 6 carbon atoms, or a phenyl group, n represents a degree of polymerization and is a value larger than 5, and m is 1 or 2. The precursor polymers represented by the formula (III) have heterocyclic structures in which the six-membered ring is internally bridged at the 4- and 7- positions by a methano group (m=1) or an ethano group (m=2). Due to this bridge in the 6-membered ring, the precursor polymers are extremely stabilized in air and the desired arylenevinylene polymer structure can be easily obtained by eliminating the bridged portion by, for example, the heat treatment. In the formula (III), Y is represented by $R_4S^+R_5M^-$ or $OR_6$, $R_4$ and $R_5$ are independently, a straight or branched chain alkyl group having 1 to 5 carbon atoms or form a tetrahydrothiophenylene ring together with a sulfur atom, $R_6$ represents H or a straight or branched alkyl group having 1 to 10 carbon atoms, and $M^-$ is an anion. As the anion $M^-$, a halide such as $Cl^-$, $Br^-$, and $I^-$, can be substituted as desired with anions such as $BF_4^-$, $PF_6^-$, $AsF_6^-$, and PTS (i.e., para-toluene sulfonic acid ion) through an anionic metathesis of sulfonium salt.

The precursor polymer is a novel polymer and is stable in air, and further is easily soluble in common solvents and can be molded to form film and fibers. Examples of such common solvents include organic solvents such as alcohol like methanol or ethanol, halogenated hydrocarbons such as chloroform or methylene chloride, saturated hydrocarbons such as hexane, aromatic hydrocarbons such as benzene or toluene, ethers such as ethyl ether or THF, ketones such as acetone, esters such as ethyl acetate or butyl acetate, amides such as dimethylformamide, and water, and solvent mixtures thereof.

The precursor polymer represented by the formula (III) of the present invention becomes stable in air and can be extremely easily handled, and further, the precursor polymers having the formula (III) are soluble in solvents, and thus it is possible to easily obtain the precursor polymer solution and a molded product of the desired arylenevinylene polymer can be obtained by molding from the precursor polymer solution or by heat treating, while molding.

Next, the process of producing the arylenevinylene polymer of the present invention is described. First, an outline of the reaction steps of the present invention is given in FIG. 1.

Here, the step of obtaining the compound represented by the formula (VI) from the compound represented by the formula (IV) via the compound represented by the formula (V) (i.e., Step A), the step of obtaining the compound represented by the formula (III)-a and/or the formula (III)-b from the compound represented by the formula (VI) (i.e., Step B), and the step of obtaining the compounds represented by the formula (I) from the compound represented by the formula (III)-a and/or (III)-b (i.e., Step C) are as described below.

Step A

First, a bishalogenomethyl compound represented by the formula (V) can be obtained by adding a halogenating agent which is capable of smoothly halogenating a methyl group attached to an aromatic group, to the compound represented by the formula (IV), and by heating the mixture under reflux. As the halogenating agent, N-bromosuccinimide (NBS), N-chlorosuccinimide (NCS), N-iodosuccinimide (NIS) and sulfuryl chloride can be exemplified. When the reactivity is relatively low, a small amount (e.g., 0.1–10 mol %) of a peroxide such as benzoylperoxide (BPO), azobisisobutyronitrile (AIBN) is preferably added to the reaction system or a light irradiation can be preferably carried out to the reaction mixture. Although there are no specific limitations to a solvent usable in the reaction, carbon tetrachloride, chloroform, benzene, etc., are preferably used in such a manner that the concentration of the reactants in the solution is suitably 0.01–0.3 mol/liter. The reaction temperature is preferably a reflux temperature and the preferable reaction time is between 20 minutes and 8 hours. The reaction is preferably carried out under a dry system and a normal atmospheric pressure is generally used.

Then, by adding a cyclic or chain compound containing sulfur to this compound, and heating, under reflux, the mixture, a bissulfonium salt compound represented by the formula (VI) can be obtained. As the cyclic or chain compound containing sulfur, the compound represented by the formula $R_4SR_5$, wherein, $R_4$, $R_5$ are each independently a straight or branched alkyl group having 1–5 carbon atoms, or form a heterocyclic ring together with a sulfur atom, are included. The sulfides usable are, for example, methyl sulfide, ethyl sulfide, tetrahydrothiophene.

This reaction is preferably carried out in the same solvent used in the above haloganating reaction. If necessary, other solvents such as acetonitrile, nitromethane can be used. The reaction can be carried out at the room temperature to a boiling temperature of the sulfide, preferably 10° C. to 60° C., more preferably 30° C. to 50° C. for, for example, 10 minutes to 4 days, preferably 4 to 8 hours. The reaction is usually carried out under a normal atmospheric pressure. Especially when a compound having a low reactivity is used, a temperature higher than the boiling point of the sulfide under a high pressure in a closed system may be used.

The compound represented by the formula (IV) can be prepared by known methods such as those of Recueil des Travaux Chimiques des Pay-Bas, by H. Wynberg, A. J. H. Klunder et al., 88, 328 (1969). According to this reference methods relating to, for example, 1,3-dimethyl-4,7-ethanoisothianaphthene, 1,3-dimethyl-4,7-methanoisothianaphthene, and the substituted compounds thereof.

Step B

The precursor polymer represented by the formula (III), includes the compound wherein $Y=R_4S^+R_5M^-$ is represented as (III)-a, and the compound wherein $Y=OR_6$ as (III)-b, in the following description.

First, the compound represented by the formula (III)-a is obtained by polymerizing the bissulfonium salt compound represented by the formula (VI), in the presence of a base. The base used in this reaction includes inorganic bases such as LiOH, KOH, and NaOH, RbOH, CsOH, $Be(OH)_2$, $Mg(OH)_2$, $Ca(OH)_2$, and $Ba(OH)_2$, or organic nitrogen-containing bases such as pyridine, triethylamine, and ammonia, etc.

The amount of the base used depends on the bissulfonium salt compound and the base employed, and cannot be determined regardless thereof. In general, however, it is preferable to use 1 to 10 equivalents, preferably 1 to 2 equivalents, of the bissulfonium salt compound.

The concentration of bissulfonium salt compound employed for producing the precursor polymer (III)-a, which may also depend on its chemical structure, is preferably within the range of from 0.01 to 2 mole/liter, more preferably from 0.05 to 0.5 mole/liter.

The polymerization temperature to be employed during the polymerization reaction for producing the precursor polymer (III)-a, is determined in accordance with the polymerization method used, and is not particularly limited. Preferably, however, it is within the range of from −80° C. to +100° C. and more preferably, the polymerization is carried out at −30° C. to +30° C.

The polymerization time depends on the polymerization method used, the polymerization temperature, or the chemical structure of bissulfonium salt compound (VI), and cannot be determined regardless thereof, but preferably the polymerization is carried out within the range of from 0.1 to 200 hours, more preferably 0.5 to 5 hours.

The solvents to be used in the polymerization reaction, depend on the chemical structure of the base and bissulfonium salt compound (VI) employed in the polymerization reaction, as for the polymerization temperature and the polymerization time, and cannot be determined regardless thereof, but any solvents able to dissolve a bissulfonium salt compound and base, and not interfering with the polymerization, can be employed. For example, polar solvents such as water, alcohols, tetrahydrofuran (THF), dioxane, dimethylformamide (DMF), dimethyl sulfoxide (DMSO), acetonitrile, and benzonitrile, or ether, ethyl acetate, and butyl acetate may be employed. Further, mixtures of these solvents also can be used. The use of water or alcohols is preferable.

When the precursor polymer (III)-a is soluble in the reaction solvent, and is obtained as a homogeneous reaction mixture, it can be isolated and purified by a dialysis and/or ion exchange operation.

Further, when the precursor polymer (III)-a is obtained as a precipitate from the reaction solvent, it can be isolated and purified by a filtration and/or reprecipitation operation.

Next, the compound represented by the formula (III)-b can be prepared by the same procedure and reaction conditions as used in preparation of the formula (III)-a, except that the solvent used should be an alcohol such as methanol or any solvent mixture of other common solvents and alcohols.

Step C

The methods of obtaining the arylenevinylene polymer represented by the formula (I), i.e., the final product obtained from the compounds of the formula (III)-a and (III)-b, which are precursor polymers will be explained.

The precursor polymers represented by the formulae (III)-a and (III)-b, can be easily converted to arylenevinylene polymers when subjected to, for example, a heat treatment. Therefore, after or while the molding of the precursor polymer, a heat treatment can be effective to thereby obtain the final polymer. 10 By subjecting the compounds of the formulas (III)-a and (III)-b, which are the precursor polymers, to, for example, a heat treatment, the alkylene at the bridged portion and the sulfide or the alkoxy group at the side chain portion are eliminated, to give the arylenevinylene polymer of the formula (I).

The heat treating conditions, which can vary widely depending on the precursor polymer employed, may be between +50° C. and a decomposition temperature (about 500° C.) but within the temperature range at which the alkylene at the bridged portion and the sulfide or the alkoxy group is completely eliminated under a vacuum or an inert gas atmosphere, and preferably is in a range of from +100° C. to +300° C. The heat treatment time differs depending on the chemical structure, and cannot be generally defined, but preferably the polymer is treated for 0.5 hour to 200 hours, more preferably 1 to 6 hours.

In the above step C, in the case of the precursor polymers represented by the formula (III)-b having alkoxy groups, by carrying out a heat treatment using an acid catalyst such as hydrochloric acid, acetic acid, conc. sulfuric acid, the elimination reaction is accelerated, whereby the heating temperature can be further lowered.

The molding steps in the process of obtaining a arylenevinylene polymer are as follows.

In the present invention, since the precursor polymer (III) to be produced is soluble in a solvent, the films (e.g., by spin cast), linear molded articles or bulk molded articles can be easily produced from the precursor polymer solution by any molding or film forming processes conventionally used in the fields of general polymer industries. The resultant molded articles can be heat-treated or doped to produce the polymer having a structure of (I) or (II) in any shape.

The solvents usable in the preparation of the precursor polymer solution are any solvents capable of dissolving the precursor polymer (III). Examples of such solvents are water; ethers such as tetrahydrofuran, dioxane; polar solvents such as dimethylformamide, acetonitrile, benzonitrile; esters such as ethyl acetate, butyl acetate; non-aromatic chlorinated solvents such as chloroform, methylene chloride; or any mixed solvents thereof. Although the solvent concentrations usable are not generally limited because the concentration of the solutions depend upon the molding conditions, the chemical structure of the precursor polymer and kinds of the solvents, the preferable concentration is 0.5–60% by weight.

The molding steps are preferably carried out in an inert gas atmosphere or under vacuum. For example, the polymer solution is coated on the surface of an appropriate medium such as a glass substrate or sodium bromide disc, to form a film, or molded articles such as fibers or bulks can be directly produced from the polymer solution. Furthermore, stretching, etc. can be effected in this step.

The molded articles obtained above are subjected to a heat treatment necessary for the elimination reaction to form the molded articles composed of the polymer having the formula (I) and further subjected to a doping to form the molded articles of the doped polymer having the formula (II). Furthermore, the heat treatment and the like can be effected, while stretching or other shaping.

The heat treatment conditions vary depending upon the shapes of the molded articles, but are preferably such that, under a vacuum or an inert gas atmosphere, the temperature is 70° C. to 500° C., more preferably 100° C. to 300° C. and the heat treatment time is preferably 0.5 to 200 hours, more preferably 1 to 6 hours.

In the case of the precursor polymer, an acid catalyst such as hydrochloric acid, acetic acid, 10 sulfuric acid can be advantageously used in combination with the heat treatment. The heat treatment can be carried out, after molding or while stretching or molding and stretching.

EXAMPLES

The present invention is described below in more detail with reference to Examples, which in no way limit the technical scope of the present invention.

Example 1

Process for preparing polyisothianaphthenylenevinylene via a precursor polymer containing sulfonium salt (a) Process for preparing 1,3-bisbromomethyl- 4,7-ethanoisothianaphthene An amount of 220 mg of 1,3-dimethyl-4,7-ethanoisothianaphthene synthesized by a known method was dissolved in 20 ml of carbon tetrachloride under an Ar atmosphere, and then 420 mg (2.36 mmol) of N-bromosuccinimide (NBS) and 2 mg of benzoylperoxide (BPO) were added, followed by heating under a reflux continuously for 12 hours. As a result, the reaction mixture, which was transparent, became a pale yellow color. The reaction product was unstable, and therefore, without isolation and purification, after a filtration of the white precipitates of succinimide from the reaction mixture, it was used as the reaction mixture for the next reaction. Note, for a confirmation of the reaction, the filtrated product was measured.

The results of the measurement of NMR and IR of the reaction product are shown below.

$^1$H-NMR: (CCl$_4$, δrel to TMS, 200 MHz) 6.45 (q, 2H), 4.55 (q, 4H), 3.91 (m, 2H), 1.55 (m, 4H)

$^{13}$C-NMR: (CCl$_4$, δrel to TMS, 50 MHz) 146.2 (1, 3-C), 134.5 (5, 6-C), 127.9 (8, 9-C), 34.7 (4, 7-C), 25.0 (1',3'-CH$_2$), 23.3 (10, 11-C)

IR: (CCl$_4$, cm$^{-1}$) 3057 w, 2962 s, 2871 m, 1595 w, 1435 w, 1200 s, 1114 w, 1079 w, 1030 w, 840 w, 707 s, 637 w, 564 w.

(b) Process for preparing 4,7-ethanoisothianaphthenyl-1,3-bis(methylenetetrahydrothiophenium bromide)

Subsequently, the reaction mixture obtained above (a) was continuously heated under refluxing, with an addition of 10 ml of chloroform and 407 mg (4.62 mmol) of tetrahydrothiophene (THT), at 50° C. and under an Ar atmosphere for 8 hours. The reaction mixture, which was pale yellow, became pale brown. After completing the reaction, the reaction solvent was evaporated under a reduced pressure, then reprecipitated with ethanol/acetone twice, and filtered and vacuum dried to obtain 73 mg of the product (yield 12%). The results of the measurement of NMR and IR, and the elemental analysis of the reaction product, are shown below.

$^1$H-NMR: (D$_2$O, δrel to DSS, 200 MHz) 6.70 (q, 4H), 4.95 (s, 4H), 4.25 (m, 2H), 3.17 (m, 8H), 2.42 (m, 8H), 1.80 (m, 4H)

$^{13}$C-NMR: (D$_2$O, δrel to DSS, 100 MHz) 153.9 (1, 3-C), 138.3 (5, 6-C), 121.4 (8, 9-C), 84.7 (1', 3'-C), 41.6, 38.1 (THT-C), 31.3 (4, 7-C), 27.9 (10, 11-c)

Elemental Analysis (%): Formula [C$_{20}$H$_{28}$S$_3$Br$_2$] Theoretical C; 45.81, H; 5.38, S; 18.34, Br; 30.47 Found C; 45.38, H; 5.51, S; 18.16, Br; 30.94.

(c) Process for preparing poly[1,3-(4,7-ethanoisothianaphthenyl)- 1',2'-ethylene-1'-tetrahydrothiophenium bromide]

An amount of 73 mg of sulfonium salt compound obtained above (b) was dissolved in 9 ml of water, cooled to 0° C. in an ice-bath under an Ar atmosphere, and vigorously agitated with an addition of 5 ml (2.5 mmol) of a 0.5 N sodium hydroxide solution. At this time, the reaction mixture changed momentarily from yellow to brown. After stirring for 3 hours, yellow precipitates appeared, and this precipitate was suction-filtered and vacuum dried to give 62 mg of a crude polymer. (yield 81%).

The results of the measurement of $^{13}$C-NMR, and an elemental analysis of the reaction mixture, are shown below.

$^{13}$C-NMR: (CDCl$_3$, δrel to TMS, 100 MHz) 145, 135, 129, 58, 40, 35, 32, 26, 19 1

Elemental Analysis (%): Formula [(C$_{16}$H$_{19}$S$_2$Br)$_n$] Theoretical C; 54.08, H; 5.38, S; 18.04, Br; 22.49 Found C; 53.72, H; 5.14, S; 18.20, Br; 21.94.

(d) Process for preparing polyisothianaphthenylenevinylene film

Figure 2:
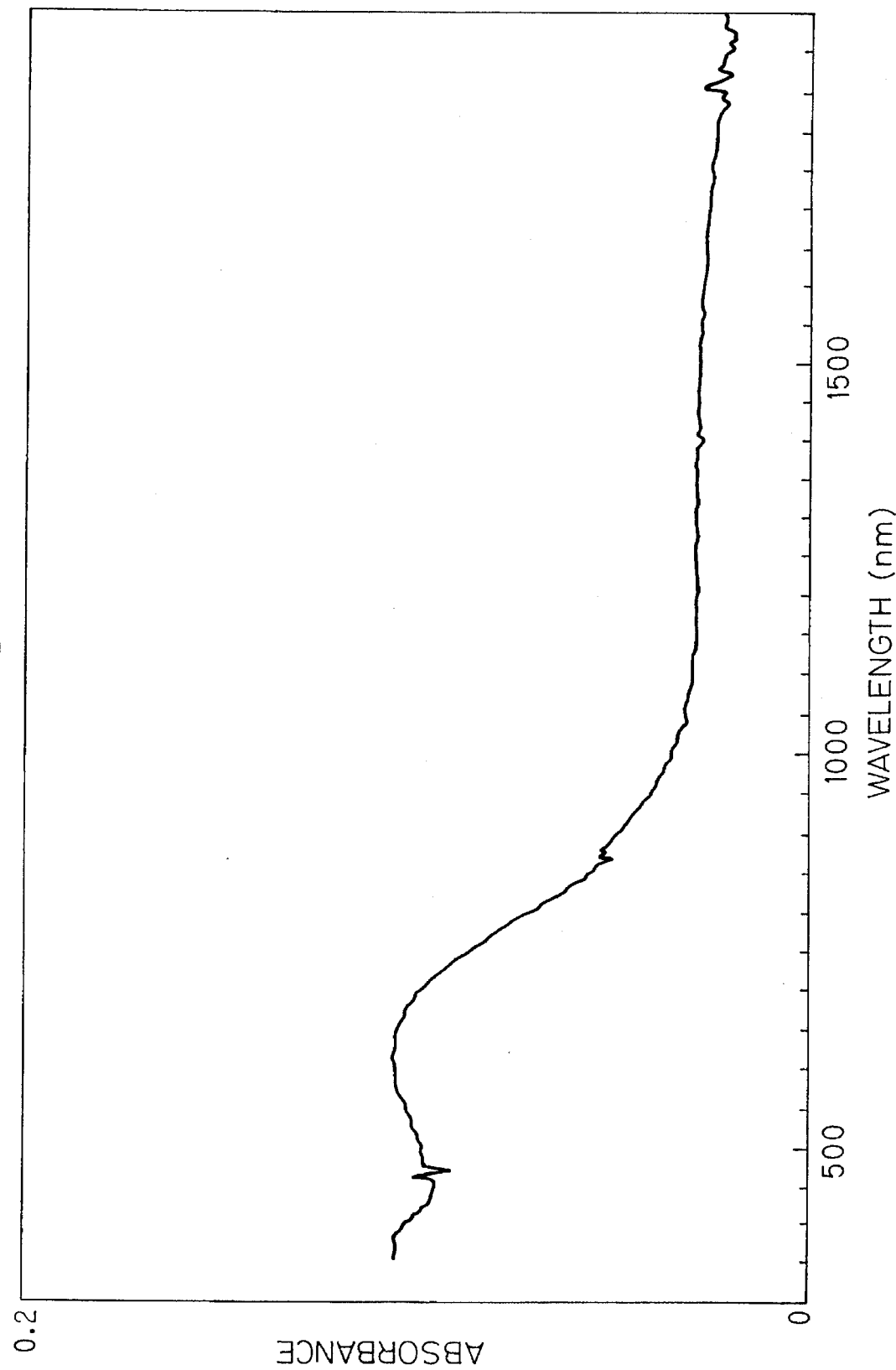
FIG. 2 shows the absorption spectrum of polyisothianaphthenylenevinylene film.
Figure 3:
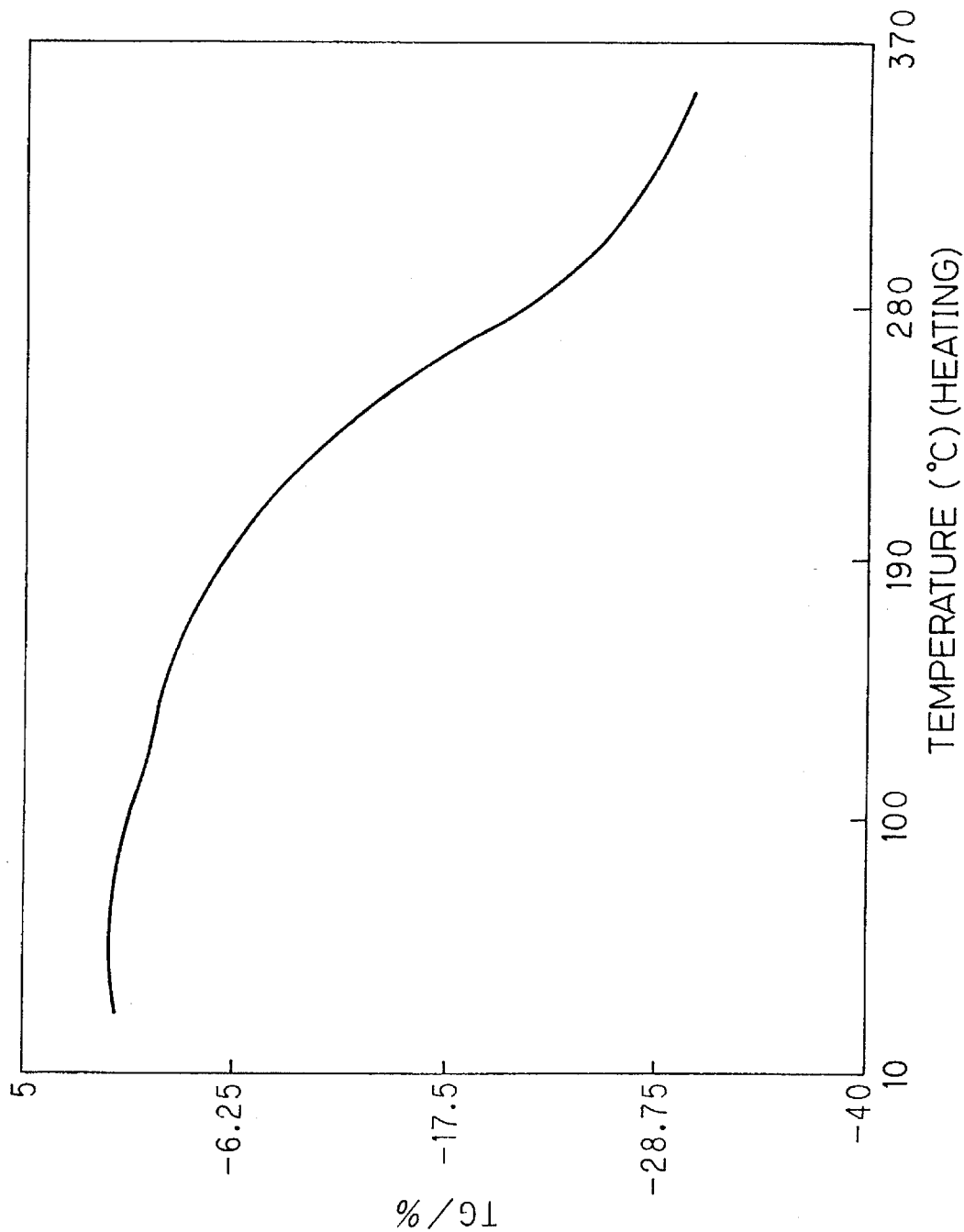
FIG. 3 shows the thermogravimetric behavior of a precursor polymer, poly[1,3-(4,7-ethanoisothianaphtenyl)-1',2'-ethylene-1'-tetrahydrothiophenium bromide] under $N_2$ atmosphere scaning at 10° C./min.
Figure 5:
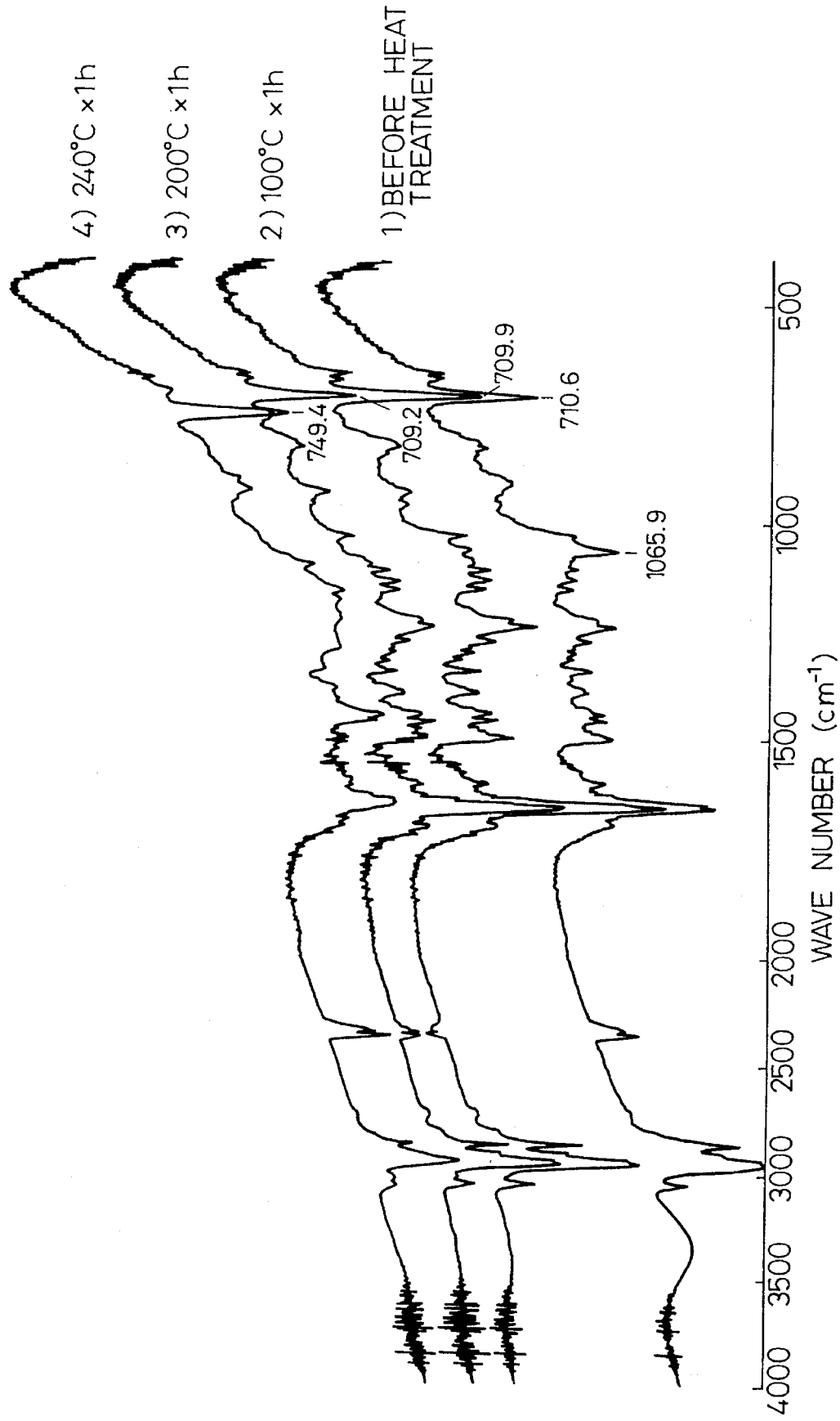
FIG. 5 is IR absorption spectra to confirm the thermal elimination reaction of the precursor polymer of Example 1, poly[1,3-(4,7-ethanoisothia naphthenyl)-1'2'- ethylene-1'-tetrahydrothiophenium bromide], where each spectrum is parallelly and upwardly drawn so that the difference between the spectra are easily observed.

An amount of 5 mg of the precursor polymer obtained in the above (c) was dissolved in 2 ml of tetrahydrofuran, and the solution was spun cast onto a glass plate, to prepare a precursor polymer film. This film was then heat treated under a vacuum at 220° C. for 4 hours. At this time, the film, which was pale yellow, changed to dark blue. The spectrum thereof is shown in FIG. 2. Also, the results of a thermogravimetric analysis (TGA) conducted for a confirmation of the thermal elimination process of this substance are shown in FIG. 3. As apparent from the TGA, the two-step elimination at around 80° C. and at around 210° C., whereby a preparation of the desired polymer was confirmed. The IR absorption spectra in the heat treatment reaction are shown in FIG. 5. From these IR adsorption spectra, the two step elimination and the preparation of the desired polymer can be confirmed.

Example 2

Process for preparing polyisothianaphthenylenevinylene via a precursor polymer containing methoxy group (a) Process for preparing poly[1,3-(4,7-ethanoisothianaphthenyl)- 1',2'-ethylene-1'-methoxy]

First, 4,7-ethanoisothianaphthenyl-1,3-bis(methylenetetrahydrothiophenium bromide) prepared in the same manner as in (a) and (b) of the above Example 1 was dissolved in 10 ml of water, 2 ml of methanol was added, and after replacement with an Ar atmosphere, the reaction mixture was cooled to −20° C. in a dry ice-carbon tetrachloride bath, to which was added 5 ml (2.5 mmol) of 0.5 N aqueous sodium hydroxide, followed by vigorous agitation. The reaction mixture momentarily changed from yellow to brown. Further, after stirring for 3 hours, the reaction mixture was slowly returned to room temperature to obtain pale yellow precipitates. The precipitate was suction filtered and vacuum dried, to give 45 mg of a crude polymer (yield 65%). The results of the measurement of $^{13}$C-NMR and an elemental analysis of the reaction mixture, are shown below.

$^{13}$C-NMR: (CDCl$_3$, δrel to TMS, 100 MHz) 146.9, 135.6, 129.4, 64.3, 57.5, 31.6

Elemental Analysis (%): Formula [(C$_{13}$H$_{14}$SO)$_n$] Theoretical C; 71.52, H; 6.46, S; 14.69 Found C; 71.41, H; 6.62, S; 14.73.

(b) Process for preparing polyisothianaphthenylenevinylene film

Figure 4:
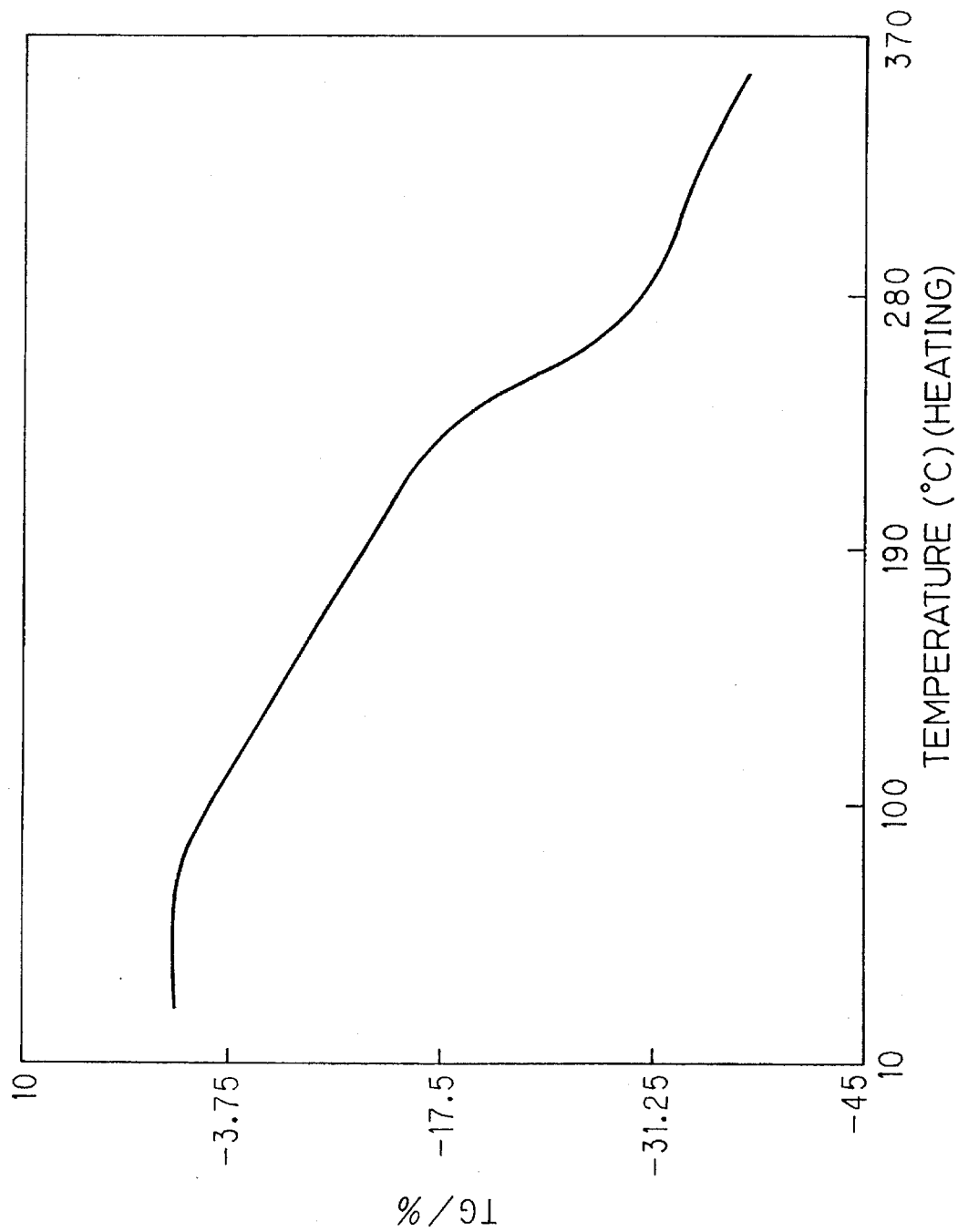
FIG. 4 shows the thermogravimetric behavior of a precursor polymer, poly[1,3-(4,7-ethanoisothianaphtenyl)-1',2'-ethylene-1'-methoxy] under $N_2$ atmosphere scaning at 10° C./min.

An amount of 5 mg of the precursor polymer obtained in the above (a) was dissolved in 2 ml of tetrahydrofuran, and the solution was spun cast on a glass plate, to prepare a precursor polymer film. This film was heat treated under a vacuum at 240° C. for 4 hours. At this time, the film, which was pale yellow, changed to dark blue. The results of a thermogravimetric analysis (TGA) conducted for a confirmation of the thermal elimination process of this substance are shown in FIG. 4. As apparent from the TGA, the two-step elimination at around 80° C. and at around 230° C., whereby the preparation of the desired polymer was confirmed.

Example 3

According to the method shown in Example 1, a polyisothianaphthenylenevinylene film was prepared on an ITO glass, and when the voltage at 0.8 Volt was electrochemically applied with an working electrode and a platinum wire as the counter-electrode, and further, a standard calomel electrode as the reference electrode, in a 0.05 mole/liter $LiClO_4^-$/acetonitrile solution, the color changed to pale gray.

Example 4

A polyisothianaphthenylenevinylene film was prepared on a glass according to the method used in Example 1. When the film was reacted with iodine in a gas phase, the film became black and the electroconductivity at room temperature was raised from $\sigma=9\times10^{-7}$ S/cm to $\sigma=4\times10^{-1}$ S/cm.

The novel arylenevinylene polymers of the present invention, and the processes for production thereof, have the following advantages compared with the arylenevinylene polymers of the prior art and the processes for production thereof.

1) The polymers obtained in the present invention can be produced via a precursor polymer stable in air, with an elimination of the bridged portion and the side chain being effected by using a known technique.

2) All of the precursor polymers used in the present invention exhibit a high solubility in common solvents, whereby the precursor polymer solutions can be easily obtained, and can be molded to form films or fibers.

3) All of the precursor polymers used in the present invention can be molded into any desired shape by a heat treatment, after, or while, molding (including stretching).

4) The polymers obtained in the present invention can be subjected to doping and dedoping operations by an electrochemical method and/or by chemical method, to thus vary the surface resistance as desired.

The polymers and the processes for production thereof have the specific features as described above, and have a high moldability or processability, and therefore, can be widely used as, for example, electrodes and sensors, for which a high processability is required in the electrical and electronic fields.

We claim:

1. A polymer containing repeating units, having the formula (III) comprising a heterocyclic structure in which the six-membered ring is internally bridged at 4- and 7- positions by a methano group (m=1) or an ethano group (m=2):

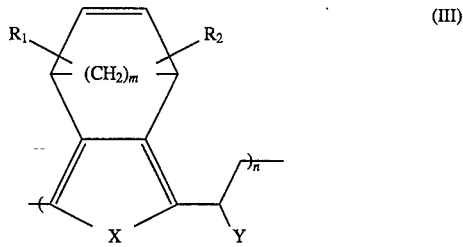

(III)

wherein $R_1$ and $R_2$ each independently represents H, a straight or branched alkyl group or alkoxy group having 1 to 20 carbon atoms, X is S, O, or $NR_3$, R3 represents H, a straight or branched alkyl group having 1 to 6 carbon atoms, or a phenyl group, Y represents $R_4S^+R_5M^-$ or $OR_6$, $R_4$ and $R_5$ each independently represents H, a straight or branched alkyl having 1 to 5 carbon atoms, or forms a tetrahydrothiohenium ring together with sulfur, and $M^-$ is an anion, $R_6$ represents H or a straight or branched alkyl group having 1 to 10 carbon atoms, m is 1 or 2, and n represents a degree of polymerization and is a value larger than 5.

2. A polymer according to claim 1, wherein X is S.

3. A polymer according to claim 1, wherein X is $NR_3$.

4. A polymer according to claim 1, wherein X is O.

5. A polymer according to claim 3, wherein $R_3$ represents H or methyl.

6. A polymer according to claim 1, wherein $R_1$ and $R_2$ each independently represents H or straight or branched alkyl group or alkoxy group having 1 to 6 carbon atoms.

7. A polymer according to claim 6, wherein $R_1$ and $R_2$ each independently represents H or straight or branched alkyl group having 1 to 6 carbon atoms.

8. A polymer according to claim 7, wherein $R_1$ and $R_2$ each represents H.

9. A polymer according to claim 8, wherein X is S.

* * * * *